US009456454B2

(12) United States Patent
Gao et al.

(10) Patent No.: US 9,456,454 B2
(45) Date of Patent: Sep. 27, 2016

(54) FLEXIBLE DISABLING/ENABLING OF CROSS-CARRIER SCHEDULING IN CARRIER-AGGREGATED WIRELESS DATA TRANSMISSION (75) Inventors: Chunyan Gao, Beijing (CN); Erlin Zeng, Beijing (CN); Jing Han, Beijing (CN); Na Wei, Beijing (CN); Haiming Wang, Beijing (CN); Wei Bai, Beijing (CN); Wei Hong, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 236 days.

(21) Appl. No.: 14/122,425

(22) PCT Filed: Jun. 2, 2011

(86) PCT No.: PCT/CN2011/075174
§ 371 (c)(1),
(2), (4) Date: Nov. 26, 2013

(87) PCT Pub. No.: WO2012/162889
PCT Pub. Date: Dec. 6, 2012

(65) Prior Publication Data
US 2014/0098774 A1    Apr. 10, 2014

(51) Int. Cl.
*H04W 72/12*    (2009.01)
*H04L 5/00*    (2006.01)
*H04L 5/14*    (2006.01)

(52) U.S. Cl.
CPC .......... *H04W 72/1268* (2013.01); *H04L 5/001* (2013.01); *H04L 5/0098* (2013.01); *H04W 72/1273* (2013.01); *H04W 72/1289* (2013.01); *H04L 5/0053* (2013.01); *H04L 5/1469* (2013.01)

(58) Field of Classification Search
None
See application file for complete search history.

(56) References Cited

U.S. PATENT DOCUMENTS

| 9,160,517 B2* | 10/2015 | Yang et al. |
| 2010/0254329 A1 | 10/2010 | Pan et al. |
| 2011/0105050 A1 | 5/2011 | Khandekar et al. |
| 2011/0205978 A1* | 8/2011 | Nory et al. ............ 370/329 |
| 2012/0076088 A1* | 3/2012 | Hwang et al. ............ 370/329 |
| 2012/0263047 A1* | 10/2012 | Love et al. ............ 370/252 |
| 2014/0029565 A1* | 1/2014 | Kim et al. ............ 370/329 |
| 2014/0161034 A1* | 6/2014 | Han et al. ............ 370/328 |
| 2015/0131536 A1* | 5/2015 | Kaur et al. ............ 370/329 |

FOREIGN PATENT DOCUMENTS

| CN | 101651996 | 2/2010 |
| CN | 101789823 | 7/2010 |
| CN | 101860396 | 10/2010 |
| CN | 101945403 | 1/2011 |
| CN | 101958772 | 1/2011 |
| CN | 101998584 | 3/2011 |

* cited by examiner

*Primary Examiner* — Hassan Kizou
*Assistant Examiner* — Roberta A Shand
(74) *Attorney, Agent, or Firm* — Oblon, McClelland, Maier & Neustadt, L.L.P (57) ABSTRACT The invention allows flexible disabling/enabling of cross-carrier scheduling in carrier-aggregated wireless data transmission. In response to detecting a predetermined disabling indication of cross-carrier scheduling of received carrier aggregated wireless data transmission, the disabling indication targeting subframes allocated to uplink in a first component carrier transmitted from a cross-carrier scheduling cell and to downlink in a second component carrier transmitted from a cross-carrier scheduled cell: a downlink control region in the targeted subframes in the second component carrier is monitored for uplink/downlink grants; and in response to detecting an uplink/downlink grant, the detected uplink/downlink grant is utilized in uplink/downlink scheduling of the targeted subframe in the second component carrier.

18 Claims, 5 Drawing Sheets

Prior Art

FLEXIBLE DISABLING/ENABLING OF CROSS-CARRIER SCHEDULING IN CARRIER-AGGREGATED WIRELESS DATA TRANSMISSION

FIELD OF THE INVENTION

The invention relates generally to mobile communications. In particular, the invention relates to methods, apparatuses and radio network nodes for flexible disabling/enabling of cross-carrier scheduling in carrier-aggregated wireless data transmission.

BACKGROUND OF THE INVENTION

Long Term Evolution (LTE) was introduced in release 8 of $3^{rd}$ Generation Partnership Project (3GPP) which is a specification for $3^{rd}$ generation mobile communication systems. LTE is a technique for mobile data transmission that aims to increase data transmission rates and decrease delays, among other things. LTE uses orthogonal frequency division multiple access (OFDMA) as its multiple access method in the downlink. The uplink uses single-carrier frequency division multiple access (SD-FDMA). 3GPP release 10 introduced a next version of LTE, named LTE Advanced (LTE-A), fulfilling $4^{th}$ generation system requirements.

Both LTE and LTE Advanced may utilize a technique called time division duplex (TDD) for separating the transmission directions from the user to the base station and back. In TDD mode, the downlink and the uplink are on the same frequency and the separation occurs in the time domain, so that each direction in a call is assigned to specific timeslots.

Herein, the term "downlink" (DL) is used to refer to the link from the base station to the mobile device or user equipment (UE), and the term "uplink" (UL) is used to refer to the link from the mobile device or user equipment to the base station.

Figure 4:
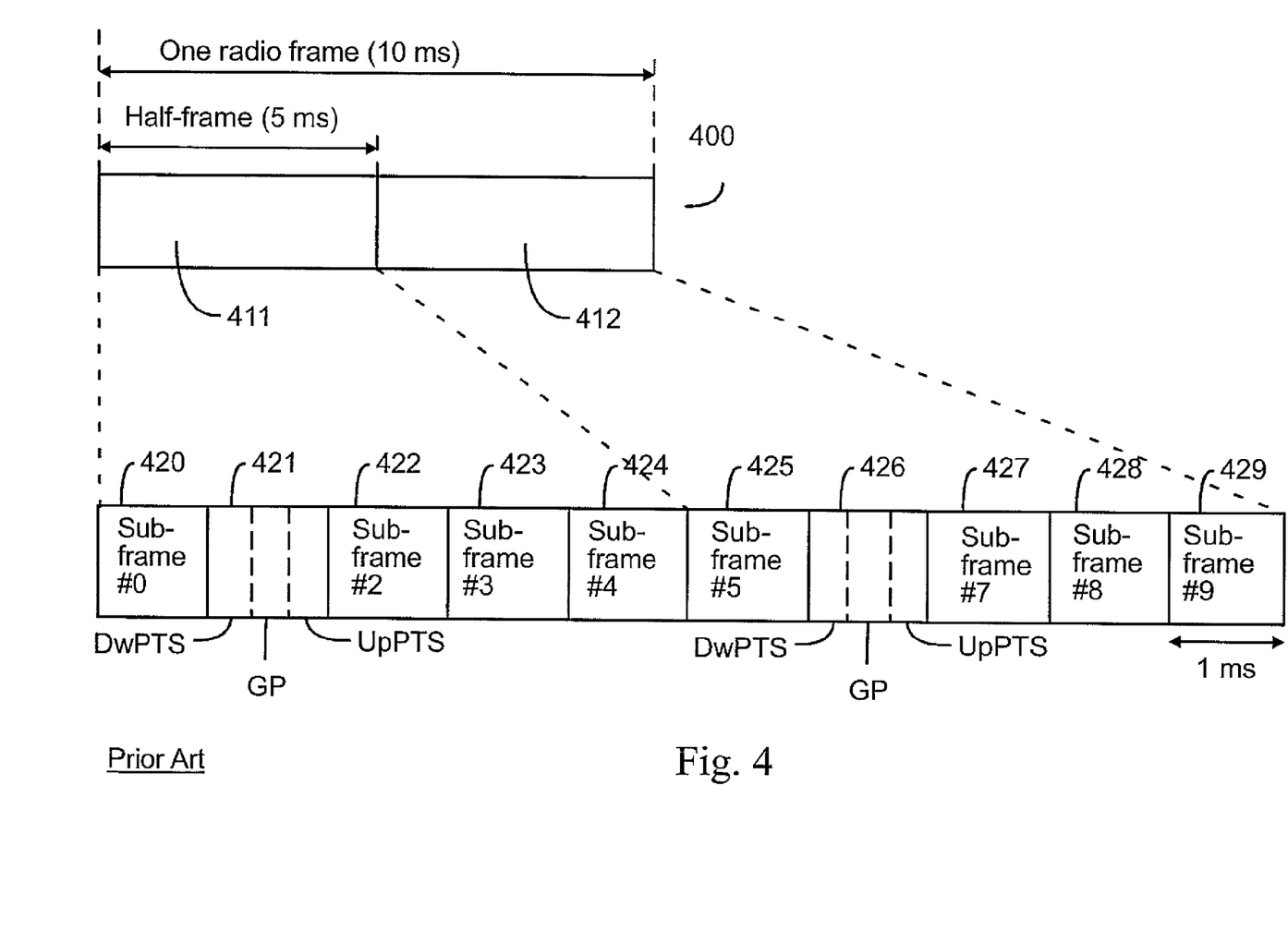
FIG. 4 is a diagram illustrating prior art frame structure for time division duplex.

FIG. 4 illustrates the frame structure for LTE TDD. The uplink and downlink for LTE TDD are divided into radio frames 400, each of which is 10 ms in length. The radio frame 400 consists of two half-frames 411, 412, both of which are 5 ms long. The first half-frame 411 is further split into five subframes 420-424, each 1 ms long. Similarly, the second half-frame 412 is further split into five subframes 425-429, each 1 ms long. Subframes 420, 422-425, and 427-429 are reserved for either downlink or uplink data, whereas subframes 421 and 426 are so called "special" subframes that include three special fields: downlink pilot time slot (DwPTS), guard period (GP) and uplink pilot time slot (UpPTS). However, as discussed below, in some configurations subframe 426 may also be reserved for downlink data, with the subframe 421 being the only special subframe. All non-special subframes consist of two time slots, both 0.5 ms long.

TDD allows asymmetry of the uplink and downlink data rates, i.e. as the amount of uplink or downlink data increases, more communication capacity can be allocated, and as the traffic load becomes lighter, capacity can be taken away.

This asymmetry is implemented via seven different semi-static uplink-downlink configurations, illustrated below in Table 1:

TABLE 1

| Uplink/downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, "D" indicates that downlink data is transmitted in this subframe, "U" indicates that uplink data is transmitted in this subframe, and "S" indicates that the special fields DwPTS, GP and UpPTS are transmitted in this subframe. As can be seen, the seven different uplink/downlink configurations 0-6 contain different ratios of uplink and downlink data, and allow asymmetric uplink and downlink data rates.

Alternative to TDD, Frequency Division Duplex (FDD) mode of operation may be used.

LTE-A also includes a feature called carrier aggregation (CA). The basic principle of CA is to extend the maximum bandwidth available in the UL or DL directions (or both) by aggregating multiple carriers called component carriers (CC) which are then jointly used for transmission to/from a single mobile terminal. These component carriers may be of different bandwidths, and may be in the same or different bands to provide maximum flexibility in utilizing available radio spectrum.

Recent releases of LTE-A have also introduced cross-carrier scheduling for carrier aggregation. Cross-carrier scheduling involves transmitting scheduling information/control signaling to the terminal on a different component carrier than the corresponding data transmission. Cross carrier scheduling can be configured per UE basis, and it may performed by adding a CIF (Carrier Indicator Field) to DCI. As is known in the art, DCI refers to Downlink Control Information, and it is carried in Physical Downlink Control Channel (PDCCH) which in turn is carried in first up to fourth OFDM symbols of a given subframe.

There are several possible use cases for cross-carrier scheduling. For example, it helps to reduce DL control overhead in some CCs since the control signaling can be transmitted elsewhere. Also, cross-carrier scheduling allows handling a case in which interference on the control region is considered as too high to allow robust control channel performance.

In case of extension carriers, there may be the case in which an extension carrier is configured without any DL control region. The motivation of having such control-less carrier may include reduced control overhead on the extension carrier or to move the control signaling to anther CC which is able to provide better link performance for the control channels.

Figure 5:
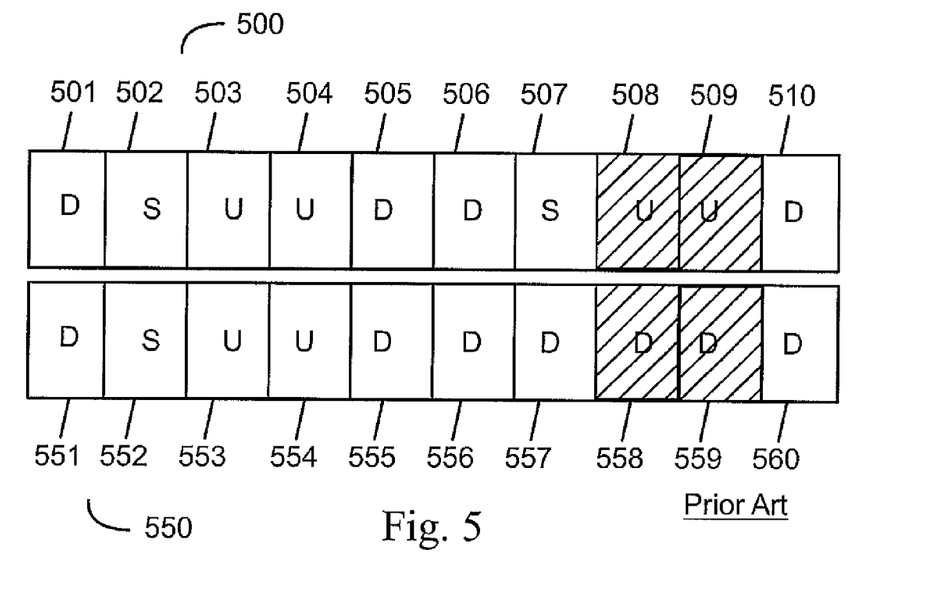
FIG. 5 is a diagram illustrating prior art TDD UL/DL configurations in cross-carrier scheduling.

For the above scenarios, an issue illustrated in FIG. 5 has been identified. In the FIG. 5, the UEs are configured with two CCs, and configured with TDD UL/DL configuration #1 (500) and #4 (550), respectively. This is considered a typical case since for the co-existence with legacy TDD systems such as TD-SCDMA, TDD UL/DL configuration #1 or #2 is considered necessary for the relevant band. In this example, there are some UEs that are configured to have cross-carrier scheduling of secondary serving cell (Scell) (the cell associated with TDD UL/DL configuration 550) from the primary serving cell (Pcell) (the cell associated with TDD UL/DL configuration 500). In general, when UEs are configured with such cross-carrier scheduling, they will only monitor UE-specific search space from the Pcell. However, since the subframes 508-509 marked with shadowing in FIG. 5 on the Pcell are UL subframes, it is not possible to transmit any DL or UL grants from these subframes on the Pcell, which means in this case the two corresponding DL subframes 558-559 (marked with shadowing) in Scell cannot be scheduled. It could be argued that for the DL subframes marked with shadowing, all UEs may not have to be scheduled there, but that eNB can schedule some other UEs that are configured with only one DL CC without cross-scheduling. This may be one way of reducing the TP loss of, not being able to schedule the UEs configured with two CCs. However, this is clearly not a satisfying solution, since for the CA-capable UEs such restriction would lead to less scheduling possibilities (thus reduced scheduling gain), and it also would result in less available Physical Downlink Shared Channel (PDSCH) resources. These restrictions would then result in overall system performance loss.

Furthermore, it is known that an extension carrier can be configured to be with or without PDCCH region as needed. Following such concept, similar with the issue above, if the Scell is an extension carrier (which is not a backwards-compatible CC) and is configured without any PDCCH region, then for the subframes marked with shadowing in FIG. 5, it is not possible for the UEs to receive any DL or UL grant corresponding to the PDSCH or Physical Uplink Shared Channel (PUSCH) on the Scell. Furthermore in this case during PDSCH de-mapping and decoding, UE will assume that there is no PDCCH region on the extension carrier (i.e. PDSCH will start from symbol #0 in the subframe). In this case, if a PDCCH were to be transmitted on the extension carrier due to lack of any DL subframe on the backwards-compatible CC, it would result in an error case in PDSCH decoding on the extension carrier.

Another relevant issue is the ambiguity on Physical Control Format Indicator Channel (PCFICH) value (which is used to indicate the number of symbols occupied by PDCCH in the subframe), if PDCCH is transmitted from Scell or the extension carrier instead. In LTE Release 10, when cross-carrier scheduling is configured, the value of the PCFICH on the cross-carrier scheduled cell would be semi-statically conveyed via a higher layer. This works for LTE Release 10 since in that case the amount of DL control needed in the cross-carrier scheduled CC will not change dynamically. One more motivation of having a semi-static PCFICH in LTE Release 10 for the cross-carrier scheduled cell is to avoid potential error cases due to high interference on the cell. On the other hand, on the Pcell the PCIFCH value is still dynamic since the number of UEs to be scheduled in a given DL subframe may not be known in advance. However for the scenario under discussed, the above considerations do not necessarily hold. For example, for the subframes marked with shadowing in FIG. 5, eNB may not be able to know accurately: a) the interference level in the control region in the Scell, and b) the number of UEs that are to be scheduled in a given DL subframe. Therefore, it is insufficient and inefficient to always use dynamic PCFICH on Scell or to have a higher layer configured PCFICH value.

Furthermore, there are severe cross-carrier scheduling issues in an unlicensed band CA scenario, in which the Pcell of licensed carriers can be potentially aggregated with Scell on unlicensed band carriers. If the Pcell in a licensed band runs out of control resources, the PDCCH for scheduling data for unlicensed Scell(s) has to be transmitted from these unlicensed Scells. However, the situation might be that not all the carriers in the unlicensed band are reliable enough to carry the PDCCH channel. For example, at time T1, CC1 in an unlicensed band is relatively more stable than other unlicensed band CCs, therefore only CC1 is configured with PDCCH control region, and CC2 and CC3 are extension carriers which are cross-scheduled from CC1. However, at time T2, the CC1 becomes less reliable, and it is more desirable to have CC3 to carry the control for this group of unlicensed band CCs. This type of reconfiguration might happen quite often due to unpredictable interference changes in unlicensed bands.

If one were to carry out this operation with current LTE Release 10 procedure, the radio resource control (RRC) signaling and medium access (MAC) signaling overhead and delay would be high, since a large amount of reconfiguration signaling would be necessary. For example:

1. First eNB needs to enable the PDCCH control region in CC3;
2. For CC1, change the cross-carrier scheduling from CC1 to CC3;
3. For CC2, change the cross-carrier scheduling from CC1 to CC3;
4. For CC3, change the cross-carrier scheduling from CC1 to CC3;
5. Then the control region in CC1 needs to be disabled.

As can be seen, it is critical to reduce the signaling overhead and delay for the cross-carrier scheduling reconfiguration for unlicensed band CA.

Therefore, an object of the present invention is to alleviate the problems described above and to introduce a solution that allows flexible disabling/enabling of cross-carrier scheduling in carrier-aggregated wireless data transmission.

SUMMARY OF THE INVENTION

A first aspect of the present invention is a method in which, in response to detecting a predetermined disabling indication of cross-carrier scheduling of received carrier aggregated wireless data transmission, the disabling indication targeting subframes allocated to uplink in a first component carrier transmitted from a cross-carrier scheduling cell and to downlink in a second component carrier transmitted from a cross-carrier scheduled cell: a downlink control region in the targeted subframes in the second component carrier is monitored for uplink/downlink grants; and in response to detecting an uplink/downlink grant, the detected uplink/downlink grant is utilized in uplink/downlink scheduling of the targeted subframe in the second component carrier.

A second aspect of the present invention is a method in which component carriers are allocated to one or more mobile nodes for carrier aggregated wireless data transmission, and time division duplex uplink/downlink configurations are allocated for the allocated component carriers. Cross-carrier scheduling is configured for the mobile nodes. The allocated time division duplex uplink/downlink configurations and the configured cross-carrier scheduling configurations are examined to determine if one or more of targeted subframes exists, the targeted subframes being subframes allocated to uplink in a first component carrier transmitted from a cross-carrier scheduling cell and to downlink in a second component carrier transmitted from a cross-carrier scheduled cell. In response to at least one targeted subframe existing, a downlink control region is transmitted for uplink/downlink grants in the targeted subframes in the second component carrier.

A third aspect of the present invention is an apparatus which comprises a downlink control region monitor that is configured to monitor, in response to a predetermined disabling indication of cross-carrier scheduling of received carrier aggregated wireless data transmission being detected, the disabling indication targeting subframes allocated to uplink in a first component carrier transmitted from a cross-carrier scheduling cell and to downlink in a second component carrier transmitted from a cross-carrier scheduled cell, a downlink control region in the targeted subframes in the second component carrier for uplink/downlink grants. The apparatus further comprises an uplink/downlink grant scheduling unit that is configured to, in response to an uplink/downlink grant being detected, utilize the detected uplink/downlink grant in uplink/downlink scheduling of the targeted subframe in the second component carrier.

A fourth aspect of the present invention is a radio network node which comprises a first allocation unit that is configured to allocate component carriers to one or more mobile nodes for carrier aggregated wireless data transmission. The radio network node further comprises a second allocation unit that is configured to allocate time division duplex uplink/downlink configurations for the allocated component carriers. The radio network node further comprises a cross-carrier scheduling unit that is configured to configure cross-carrier scheduling for the mobile nodes. The radio network node further comprises an examination unit that is configured to examine the allocated time division duplex uplink/downlink configurations and the configured cross-carrier scheduling configurations to determine if one or more of targeted subframes exists, the targeted subframes being subframes allocated to uplink in a first component carrier transmitted from a cross-carrier scheduling cell and to downlink in a second component carrier transmitted from a cross-carrier scheduled cell. The radio network node further comprises a downlink control region transmission unit that is configured to, in response to at least one targeted subframe existing, transmit a downlink control region for uplink/downlink grants in the targeted subframes in the second component carrier.

In an embodiment of the invention, the detection of the predetermined disabling indication comprises examining received time division duplex uplink/downlink configurations and cross-carrier scheduling configurations to determine if one or more of the targeted subframes exist, and if yes, interpreting it as the disabling indication. Control format signaling may be received which comprises a control format indicator having a value indicating a length of the downlink control region in the targeted subframes in the second component carrier, wherein the monitoring the downlink control region is performed based on the received control format indicator value. In response to detecting a downlink grant, the utilizing may comprise deriving a starting point of downlink user data from the received length of the downlink control region for at least one of de-mapping and decoding the downlink user data.

In an embodiment of the invention, the detection of the predetermined disabling indication comprises receiving disabling indication signaling comprising the disabling indication. The disabling indication may comprise a bitmap containing subframe specific indications indicating whether for a given subframe the cross-carrier scheduling is to be enabled or disabled. Alternatively, the disabling indication may comprise a bitmap containing carrier specific indications indicating whether for a given set of carriers the cross-carrier scheduling is to be enabled or disabled. The disabling indication signaling may be comprised in one of radio resource control signaling and medium access signaling.

In an embodiment of the invention, a control format indicator having a value indicating a length of the downlink control region in the targeted subframes in the second component carrier is configured; and the configured control format indicator is transmitted to the mobile nodes via control format signaling.

In an embodiment of the invention, the value of the control format indicator is one of semi-static and dynamic.

In an embodiment of the invention, downlink user data in the targeted subframes in the second component carrier is mapped based on the value of the configured control format indicator.

In an embodiment of the invention, at least one of the methods is performed by a data-processing device controlled by a computer program embodied on a computer readable medium.

In an embodiment of the invention, the apparatus comprises a long term evolution enabled mobile device, the downlink control region comprises a physical downlink control channel, the control format indicator comprises a physical control format indicator channel, and the downlink user data comprises a physical downlink shared channel.

It is to be understood that the aspects and embodiments of the invention described above may be used in any combination with each other. Several of the aspects and embodiments may be combined together to form a further embodiment of the invention. A method, an apparatus, or a radio network node which is an aspect of the invention may comprise at least one of the embodiments of the invention described above.

The invention allows flexible disabling/enabling of cross-carrier scheduling in carrier-aggregated wireless data transmission.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1A:
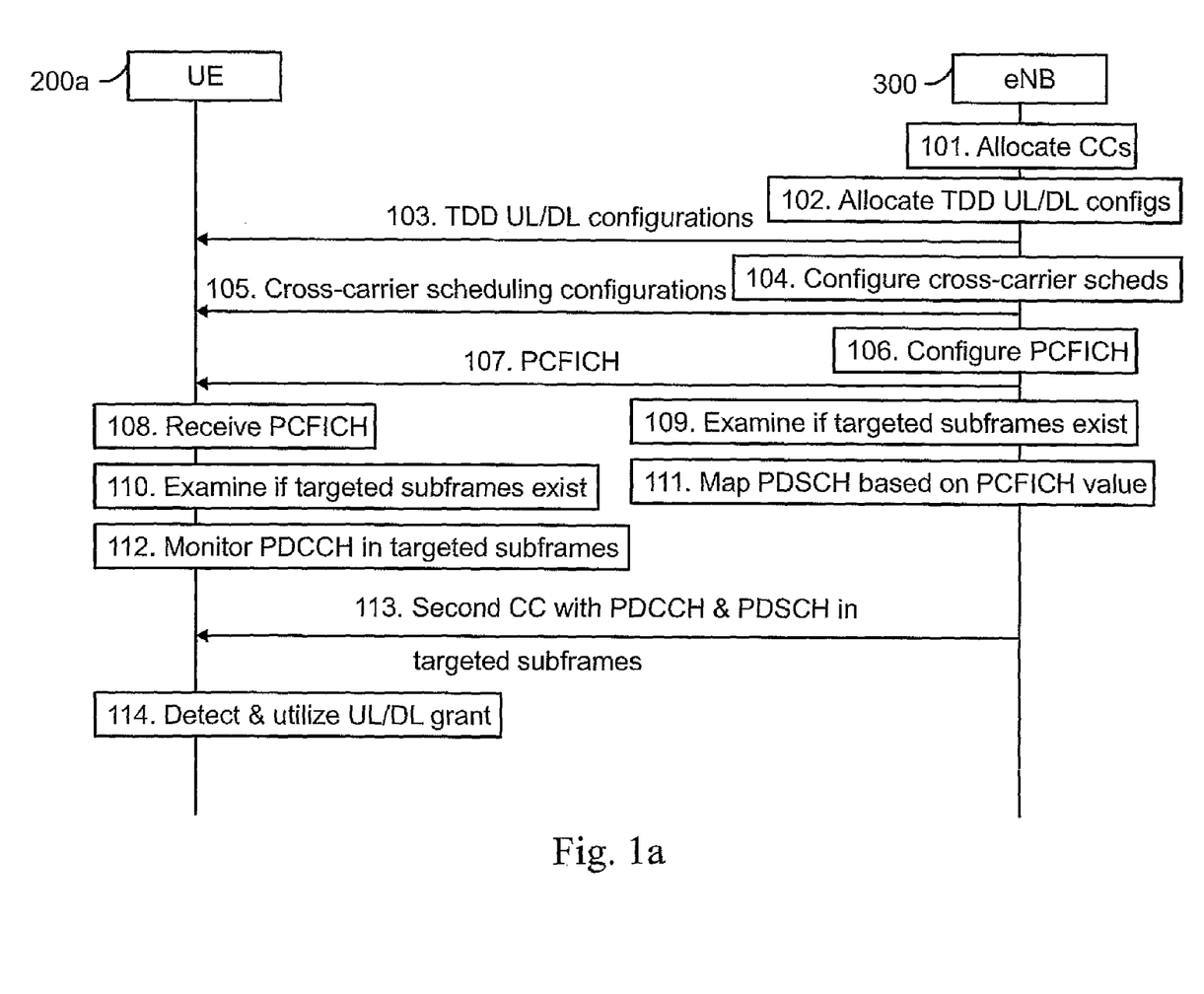
FIG. 1a is a flow diagram illustrating a method according to an embodiment of the invention.

FIG. 1a is a flow diagram illustrating a method of flexible disabling/enabling of cross-carrier scheduling in carrier-aggregated wireless data transmission according to an embodiment of the invention.

At step 101, a radio network node 300 allocates component carriers to a mobile node 200a for carrier aggregated wireless data transmission. At step 102, the radio network node 300 allocates time division duplex uplink/downlink configurations for the allocated component carriers. The allocated TDD UL/DL configurations are then transmitted to the mobile node 200a, step 103.

Then, the radio network node 300 configures cross-carrier scheduling for the mobile node 200a, step 104. The configured cross-carrier scheduling configurations are transmitted to the mobile node 200a, step 105.

The radio network node 300 configures a control format indicator having a value indicating a length of the downlink control region in the targeted subframes in the second component carrier, step 106. The value of the control format indicator may be semi-static or dynamic, as needed. For example, if interference on the downlink control region in a cross-carrier scheduled cell is considered to be so high that the control format indicator is not reliable, the radio network node 300 may choose a semi-static control format indicator value and indicate this value to the mobile node 200a.

On the other hand, if the radio network node 300 determines that the value of the control format indicator doesn't have to be changed during a certain period since the amount of control signals doesn't change dynamically on the cross-carrier scheduled cell in targeted subframes (explained in more detail below with reference to step 109), the radio network node 300 can configure a semi-static value for the control format indicator and indicate this to the mobile node 200a.

On the other hand, if the radio network node 300 determines that the value of the control format indicator will change dynamically during a certain period, the radio network node 300 may configure a dynamic control format indicator to the mobile node 200a.

Then, the configured control format indicator is transmitted to the mobile node 200a via control format signaling, step 107. The control format signaling comprising the control format indicator is received at the mobile node 200a, step 108. For targeted subframes, the mobile node 200a may determine via a higher layer whether the control format indicator is semi-static of dynamic. If it is dynamic, the mobile node 200a may e.g. detect the control format indicator value in a predetermined resource.

At step 109, the radio network node 300 examines the allocated TDD UL/DL configurations and the configured cross-carrier scheduling configurations to determine if one or more of targeted subframes exist. Herein, the term "targeted subframes" refers to subframes which are allocated to uplink in a first component carrier transmitted from a cross-carrier scheduling cell (i.e. a cell that functions as the source of the cross-carrier scheduling) and to downlink in a second component carrier transmitted from a cross-carrier scheduled cell (i.e. a cell that functions as the target of the cross-carrier scheduling).

At step 110, the mobile node 200a performs detection of a predetermined disabling indication of cross-carrier scheduling of received carrier aggregated wireless data transmission by examining the received time division duplex uplink/downlink configurations and cross-carrier scheduling configurations to determine if one or more of the targeted subframes exist, and if yes, interpreting it as the disabling indication.

At step 111, the radio network node 300 maps downlink user data in the targeted subframes in the second component carrier based on the value of the control format indicator configured at step 106.

At step 112, the mobile node 200a monitors the downlink control region in the targeted subframes in the second component carrier for uplink/downlink grants in response to positive detection of the predetermined disabling indication of cross-carrier scheduling at step 110. The monitoring of the downlink control region may be performed based on the control format indicator value received at step 108.

At step 113, in response to having found at least one targeted subframe to exist at step 109, the radio network node 300 transmits a downlink control region for uplink/downlink grants in the targeted subframes in the second component carrier.

At step 114, the mobile node 200a detects and utilizes a received uplink/downlink grant in uplink/downlink scheduling of the targeted subframe in the second component carrier. The utilizing may comprise deriving a starting point of downlink user data from the received length of the downlink control region for at least one of de-mapping and decoding the downlink user data.

The method of FIG. 1a may be utilized as a solution to the misalignment of channel quality information (CQI) measurement, when the CQI is calculated based on the assumption that there is no downlink control region, but there actually is a downlink control region in the subframe, which may reduce the resources for downlink user data accordingly.

If an extension carrier is configured with "non-control", then CQI is reported by assuming "no downlink control region", but the actual downlink user data resource allocation in the targeted subframe is based on prior knowledge of the configurations at the radio network node 300 side. The radio network node 300 may properly scale the MCS (modulation and coding scheme) for downlink user data in the targeted subframe by taking into account the amount of resources occupied by the control channel in that subframe.

In other words, radio network node 300 still assumes the CQI reporting of the mobile node 200a is based on the assumption that the number of downlink control region symbols in any DL subframes in the cross-carrier scheduled cell is zero.

For DL subframes other than the targeted subframe, the radio network node 300 will determine the MCS based on the CQI reporting from the mobile node 200a, while for the targeted DL subframe, the radio network node 300 will scale the MCS based on the extra value of the control format indicator. For example, if the control format indicator value is equal to three in a given subframe, the amount of resources for the downlink user data shall be scaled with a factor 11/14 to reflect the actual resources usable to the downlink user data.

Figure 1B:
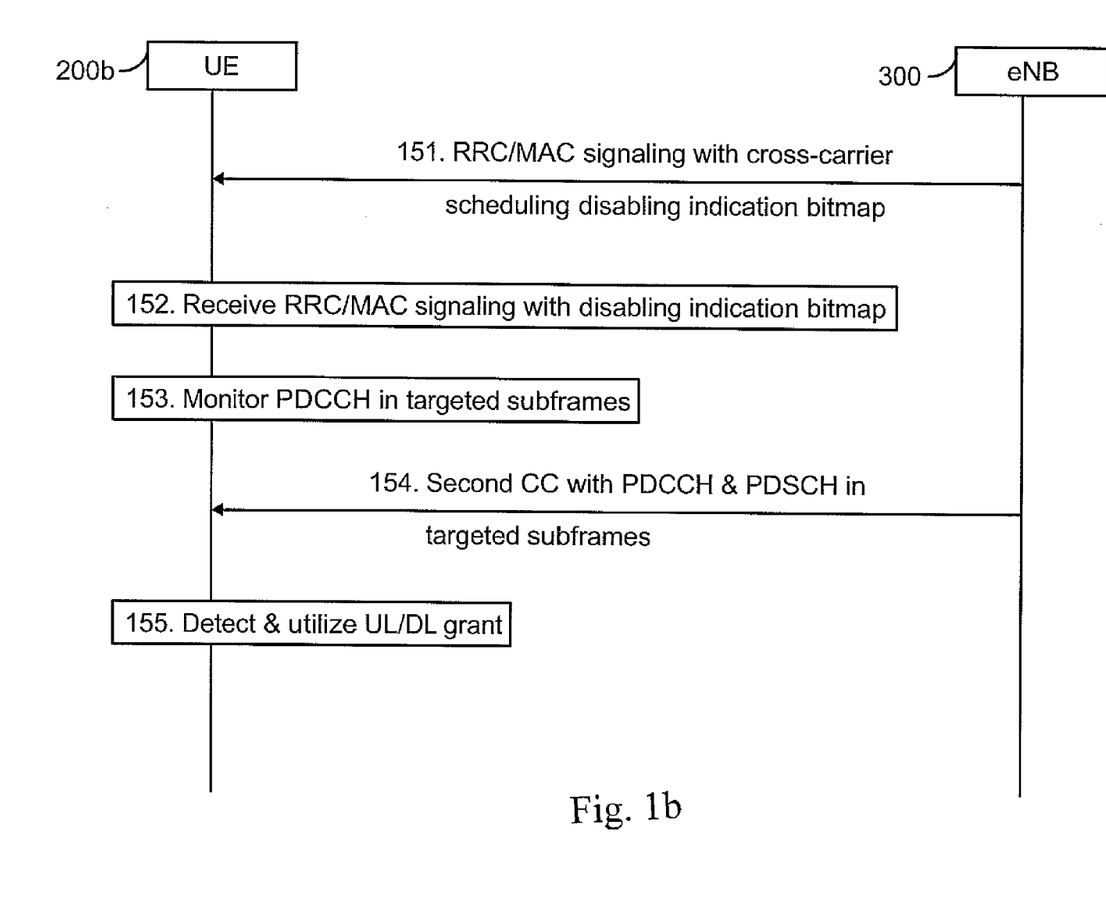
FIG. 1b is a flow diagram illustrating a method according to another embodiment of the invention.

FIG. 1b is a flow diagram illustrating a method of flexible disabling/enabling of cross-carrier scheduling in carrier-aggregated wireless data transmission according to another embodiment of the invention.

At step 151, the radio network node 300 transmits disabling indication of cross-carrier scheduling of received carrier aggregated wireless data transmission. In this embodiment, the disabling indication is comprised in disabling indication signaling. The disabling indication may comprise a bitmap containing subframe specific indications that indicate whether for a given subframe the cross-carrier scheduling is to be enabled or disabled. Alternatively, the disabling indication may comprise a bitmap containing carrier specific indications indicating whether for a given set of carriers the cross-carrier scheduling is to be enabled or disabled. The disabling indication signaling may be comprised e.g. in one of radio resource control (RRC) signaling and medium access (MAC) signaling.

At step 152, the mobile node 200b receives the disabling indication signaling comprising the disabling indication. At step 153, the mobile node 200b monitors the downlink control region in the targeted subframes in the second component carrier for uplink/downlink grants in response to positive detection of the disabling indication of cross-carrier scheduling received at step 152.

At step 154, the radio network node 300 transmits a downlink control region for uplink/downlink grants in the targeted subframes in the second component carrier. At step 155, the mobile node 200b detects and utilizes a received uplink/downlink grant in uplink/downlink scheduling of the targeted subframe in the second component carrier.

Figure 6:
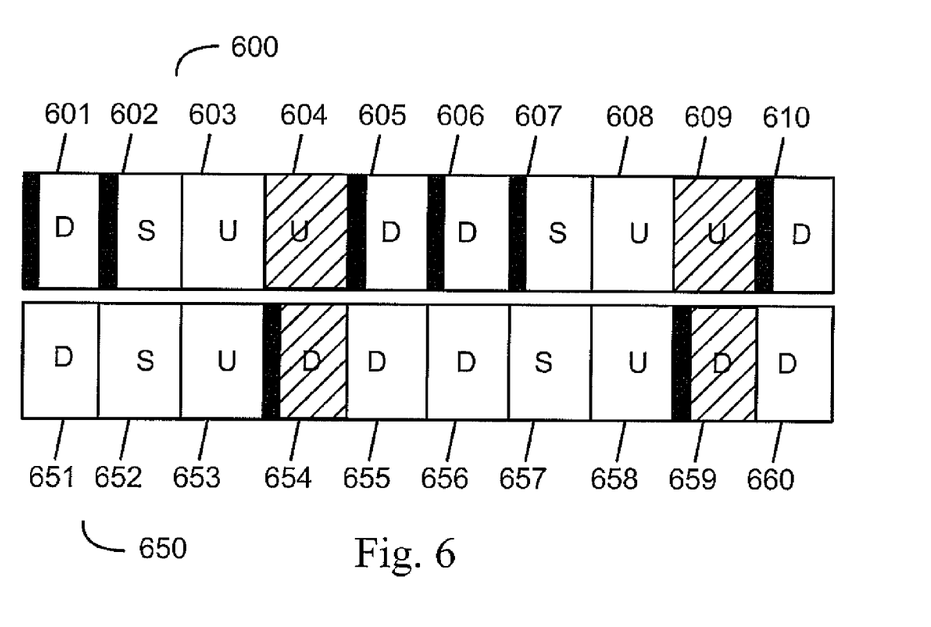
FIG. 6 is a diagram illustrating TDD UL/DL configurations in cross-carrier scheduling according to an embodiment of the invention.

For example to support the case illustrated in FIG. 6, MAC/RRC signaling may be used to indicate on certain subframes whether the cross-carrier scheduling enabled or disabled. The bitmap here can be set e.g. to {0001000010}, where "1" is interpreted as "disable cross-scheduling". Therefore, it indicates that for subframes #3 (604, 654) and #8 (609, 659) marked with shadowing, the cross-carrier scheduling is disabled, and DL and UL grants linked to subframes #3 and #8 will be scheduled from the cross-carrier scheduled cell. The black squares at subframes 601, 602, 605, 606, 607, 610, 654, 659 in FIG. 6 indicate the presence of the downlink control region, such as a physical downlink control channel.

Considering the case in which the cross-carrier scheduled cell is an extension carrier, the availability of the downlink control region may be indicated with a bitmap such as {0001000010}. It indicates that the downlink control region is configured in the cross-carrier scheduled cell in subframes #3 and #8, while for other subframes the downlink control region is configured only in the cross-carrier scheduling cell. For the cross-carrier scheduled cell extension carrier, the cross-carrier scheduling is disabled in subframes #3 and #8.

The length of bitmap may be e.g. 8 for FDD and e.g. 10 for TDD. However, any shorter or longer length may be utilized as needed.

Another possible use for the embodiment of FIG. 1b is eICIC (intercell interference coordination) with CA, in which some subframes are configured with Almost Blanked Subframe (ABS) in a macro-cell. For example, it may be desirable to have the downlink control region on Pico cell F1 when the ABS is applied in Macro-cell F1, and other subframes are cross-scheduled from Pico cell F2.

Furthermore, the embodiment of FIG. 1b may be implemented in carrier domain. For example, for unlicensed band CA cross-carrier scheduling reconfiguration, it is proposed to define a group of unlicensed carriers into a scheduling carrier set. RRC/MAC signaling as described above may be sent to the affected UEs about the downlink control region configuration for this set. For example, at a first time T1, the availability of the downlink control region in a first component carrier CC1 may be indicated with a bitmap {00}. And at a second time T2, the availability of the downlink control region in a third component carrier CC3 may be indicated with a bitmap {10}. This way, signaling overhead and delay can be reduced.

If the linkage of cross-scheduling of other cross-carrier scheduled cell will always be linked to the one carrier with downlink control region on, the availability of downlink control region in a certain carrier may be indexed with a bitmap. The length of bitmap can be e.g. ceil(log 2(N_cc_scs)), where N_cc_scs is the number of the carrier within a scheduling carrier set.

However, if the intention is not cross-carrier scheduling linkage, but just to indicate whether a certain carrier has a downlink control region or not, the length of bitmap can be e.g. N_cc_scs, or some other length that fits.

It is to be understood that the unlicensed band CA is used as an example herein. However, the invention is not restricted to that.

Furthermore, the embodiment of FIG. 1b may be implemented in both time and frequency domain. That is, the downlink control region availability indication can also be applied to both time and frequency domain. The bitmap can be e.g. up to length 8*N_cc_scs for FDD, and e.g. 10*N_cc_scs for TDD, or some other length that fits.

Figure 2A:
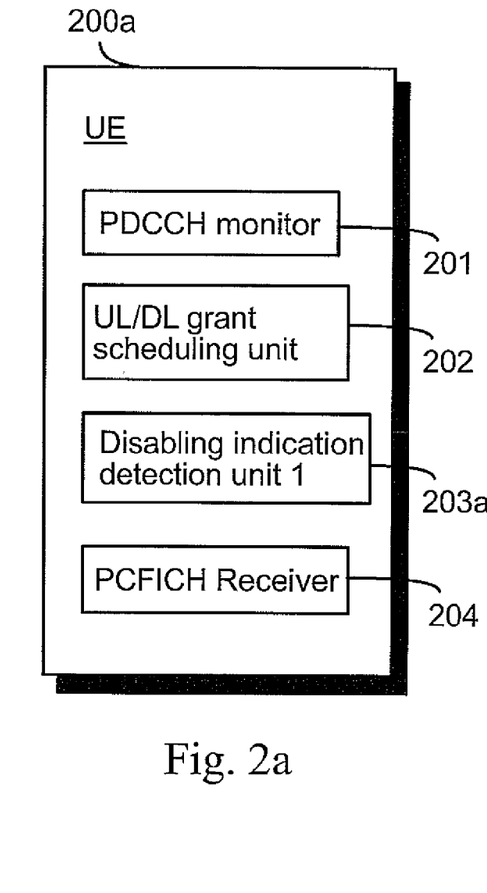
FIG. 2a is a block diagram illustrating an apparatus according to an embodiment of the invention.

FIG. 2a is a block diagram illustrating an apparatus 200a according to an embodiment of the invention. The apparatus 200 may comprise e.g. a mobile device or a handset or a user equipment (UE) of a mobile communications network. Alternatively, the apparatus 200a may comprise e.g. a chipset deployed in a mobile device or a handset or a user equipment of a mobile communications network.

The apparatus 200a comprises a downlink control region monitor 201 that is configured to monitor, in response to a predetermined disabling indication of cross-carrier scheduling of received carrier aggregated wireless data transmission being detected, the disabling indication targeting subframes allocated to uplink in a first component carrier transmitted from a cross-carrier scheduling cell and to downlink in a second component carrier transmitted from a cross-carrier scheduled cell, a downlink control region in the targeted subframes in the second component carrier for uplink/downlink grants.

The apparatus 200a further comprises an uplink/downlink grant scheduling unit 202 that is configured to, in response to an uplink/downlink grant being detected, utilize the detected uplink/downlink grant in uplink/downlink scheduling of the targeted subframe in the second component carrier.

The apparatus 200a further comprises a first disabling indication detection unit 203a that is configured to perform the detection of the disabling indication by examining received time division duplex uplink/downlink configurations and cross-carrier scheduling configurations to determine if one or more of the targeted subframes exist, and if yes, interpreting it as the disabling indication.

The apparatus 200a further comprises a control format indicator receiver 204 that is configured to receive control format signaling comprising a control format indicator having a value indicating a length of the downlink control region in the targeted subframes in the second component carrier. Here, the downlink control region monitor 201 may be configured to perform the monitoring of the downlink control region based on the received control format indicator value.

In response to a downlink grant being detected, the uplink/downlink grant scheduling unit 202 may be configured to perform the utilizing by deriving a starting point of downlink user data from the received length of the downlink control region for at least one of de-mapping and decoding the downlink user data.

Figure 2B:
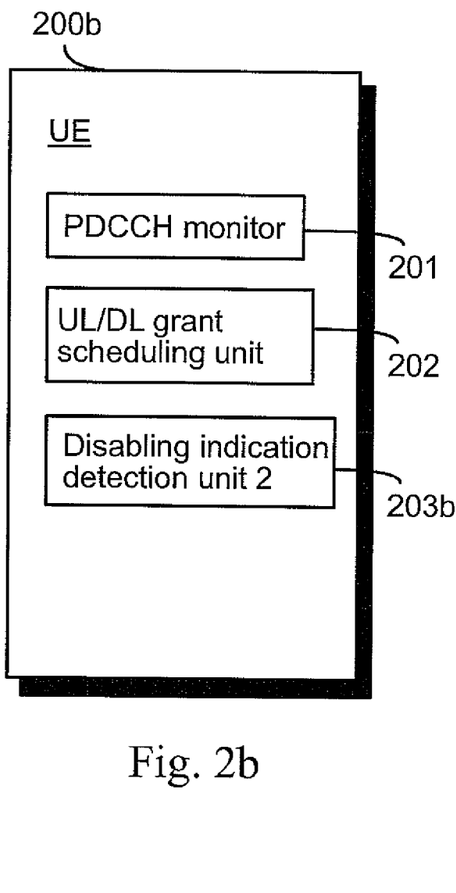
FIG. 2b is a block diagram illustrating an apparatus according to another embodiment of the invention.

FIG. 2b is a block diagram illustrating an apparatus 200b according to an embodiment of the invention. The apparatus 200 may comprise e.g. a mobile device or a handset or a user equipment (UE) of a mobile communications network.

Alternatively, the apparatus 200b may comprise e.g. a chipset deployed in a mobile device or a handset or a user equipment of a mobile communications network.

The apparatus 200b comprises a downlink control region monitor 201 that is configured to monitor, in response to a predetermined disabling indication of cross-carrier scheduling of received carrier aggregated wireless data transmission being detected, the disabling indication targeting subframes allocated to uplink in a first component carrier transmitted from a cross-carrier scheduling cell and to downlink in a second component carrier transmitted from a cross-carrier scheduled cell, a downlink control region in the targeted subframes in the second component carrier for uplink/downlink grants.

The apparatus 200b further comprises an uplink/downlink grant scheduling unit 202 that is configured to, in response to an uplink/downlink grant being detected, utilize the detected uplink/downlink grant in uplink/downlink scheduling of the targeted subframe in the second component carrier.

The apparatus 200b further comprises a second disabling indication detection unit 203b that is configured to perform the detection of the disabling indication by receiving disabling indication signaling comprising the disabling indication. The disabling indication may comprise a bitmap containing subframe specific indications indicating whether for a given subframe the cross-carrier scheduling is to be disabled. Also, the disabling indication signaling may be comprised in one of radio resource control signaling and medium access signaling.

Figure 3:
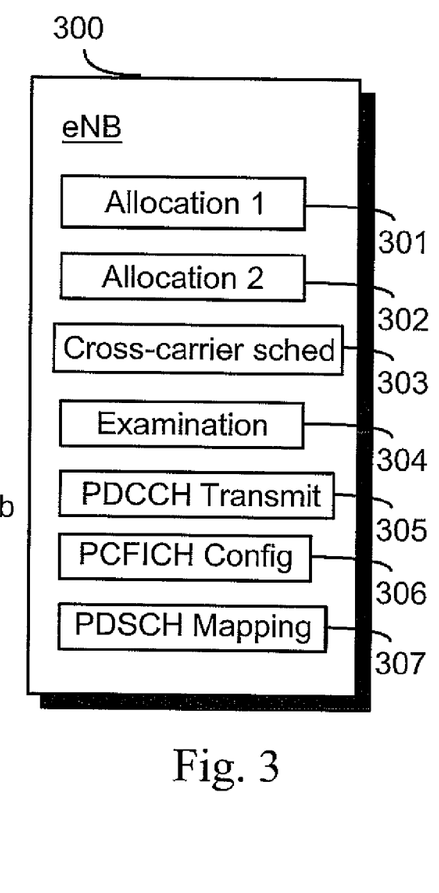
FIG. 3 is a block diagram illustrating a radio network node according to an embodiment of the invention.

FIG. 3 is a block diagram illustrating a radio network node 300 according to an embodiment of the invention. The radio network node 300 may comprise e.g. a base station or an evolved Node B (eNB). The radio network node 300 may be deployed e.g. in a mobile communications network utilizing a version of LTE technology, such as LTE Advanced, for example.

The radio network node 300 comprises a first allocation unit 301 that is configured to allocate component carriers to one or more mobile nodes for carrier aggregated wireless data transmission. The radio network node 300 further comprises a second allocation unit 302 that is configured to allocate time division duplex uplink/downlink configurations for the allocated component carriers. The radio network node 300 further comprises a cross-carrier scheduling unit 303 that is configured to configure cross-carrier scheduling for the mobile nodes.

The radio network node 300 further comprises an examination unit 304 that is configured to examine the allocated time division duplex uplink/downlink configurations and the configured cross-carrier scheduling configurations to determine if one or more of targeted subframes exists, the targeted subframes being subframes allocated to uplink in a first component carrier transmitted from a cross-carrier scheduling cell and to downlink in a second component carrier transmitted from a cross-carrier scheduled cell.

The radio network node 300 further comprises a downlink control region transmission unit 305 that is configured to, in response to at least one targeted subframe existing, transmit a downlink control region for uplink/downlink grants in the targeted subframes in the second component carrier.

The radio network node 300 further comprises a control format indicator unit 306 that is configured to configure a control format indicator having a value indicating a length of the downlink control region in the targeted subframes in the second component carrier; and further configured to transmit the configured control format indicator to the mobile nodes via control format signaling. The value of the control format indicator may be semi-static or dynamic.

The radio network node 300 further comprises a downlink user data mapping unit 307 that is configured to map downlink user data in the targeted subframes in the second component carrier based on the value of the configured control format indicator.

In all of the embodiments of FIGS. 1a-3, the downlink control region may comprise a physical downlink control channel (PDCCH), the control format indicator may comprise a physical control format indicator channel (PCFICH), and/or the downlink user data may comprise a physical downlink shared channel (PDCCH).

Advantages of the present invention include:
a) if Scell is a backwards-compatible CC:
   cross scheduling from Pcell is possible when it is a DL subframe in Pcell
   no need for new PDCCH timing and DCI format
b) if Scell is an extension carrier configured with non-PDCCH:
   same advantages as above, and in addition
   DL efficiency from a PDCCH-less carrier is possible for the DL subframes other than those in which it is an UL subframe on the Pcell.

Also, the flexibility of configurable PDCCH availability via explicit signaling can enable:
   support of PDCCH grants when cross-carrier scheduling is not feasible.
   support of utilization of more reliable PDCCH transmission in a certain subframe or a carrier with less interference.

The exemplary embodiments can include, for example, any suitable servers, workstations, PCs, laptop computers, personal digital assistants (PDAs), Internet appliances, handheld devices, cellular telephones, smart phones, wireless devices, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method, comprising:
    detecting a disabling indication of cross-carrier scheduling of received carrier aggregated wireless data transmission, the disabling indication targeting subframes allocated to uplink in a first component carrier transmitted from a cross-carrier scheduling cell and to downlink in a second component carrier transmitted from a cross-carrier scheduled cell, wherein the detecting includes examining received time division duplex uplink/downlink configurations and cross-carrier scheduling configurations to determine if one or more of the targeted subframes exist;
    monitoring a downlink control region in the targeted subframes in the second component carrier for uplink/downlink grants; and
    utilizing the detected uplink/downlink grant in uplink/downlink scheduling of the targeted subframe in the second component carrier in response to detecting an uplink/downlink grant.

2. The method of claim 1, further comprising:
    receiving control format signaling comprising a control format indicator having a value indicating a length of the downlink control region in the targeted subframes in the second component carrier, wherein
    monitoring the downlink control region is performed based on the received control format indicator value.

3. The method of claim 2, wherein
    the utilizing comprises deriving a starting point of downlink user data from the received length of the downlink control region for at least one of de-mapping and decoding the downlink user data in response to detecting a downlink grant.

4. The method of claim 1, wherein
    the detecting the predetermined disabling indication comprises receiving disabling indication signaling comprising the disabling indication.

5. The method of claim 4, wherein
    the disabling indication comprises a bitmap containing subframe specific indications indicating whether for a given subframe the cross-carrier scheduling is to be enabled or disabled.

6. The method of claim 4, wherein
    the disabling indication comprises a bitmap containing carrier specific indications indicating whether for a given set of carriers the cross-carrier scheduling is to be enabled or disabled.

7. The method of claim 4, wherein
    the disabling indication signaling is comprised in one of radio resource control signaling and medium access signaling.

8. An apparatus comprising:
circuitry configured to
  detect a disabling indication of cross-carrier scheduling of received carrier aggregated wireless data transmission, the disabling indication targeting subframes allocated to uplink in a first component carrier transmitted from a cross-carrier scheduling cell and to downlink in a second component carrier transmitted from a cross-carrier scheduled cell, wherein the detecting includes examining received time division duplex uplink/downlink configurations and cross-carrier scheduling configurations to determine if one or more of the targeted subframes exist;
  monitor a downlink control region in the targeted subframes in the second component carrier for uplink/downlink grants; and
  utilize the detected uplink/downlink grant in uplink/downlink scheduling of the targeted subframe in the second component carrier in response to an uplink/downlink grant being detected.

9. The apparatus of claim 8, wherein the circuitry is configured to:
  receive control format signaling comprising a control format indicator having a value indicating a length of the downlink control region in the targeted subframes in the second component carried; and
  perform the monitoring of the downlink control region based on the received control format indicator value.

10. The apparatus of claim 9, wherein
  the circuitry is configured to perform the utilizing by deriving a starting point of downlink user data from the received length of the downlink control region for at least one of de-mapping and decoding the downlink user data in response to a downlink grant being detected.

11. The apparatus of claim 8, wherein
  the circuitry is configured to perform the detection of the disabling indication by receiving disabling indication signaling comprising the disabling indication.

12. The apparatus of claim 11, wherein
  the disabling indication comprises a bitmap containing subframe specific indications indicating whether for a given subframe the cross-carrier scheduling is to be enabled or disabled.

13. The apparatus of claim 11, wherein
  the disabling indication comprises a bitmap containing carrier specific indications indicating whether for a given set of carriers the cross-carrier scheduling is to be enabled or disabled.

14. The apparatus of claim 9, wherein the apparatus is a long term evolution enabled mobile device, the downlink control region comprises a physical downlink control channel, the control format indicator comprises a physical control format indicator channel, and the downlink user data comprises a physical downlink shared channel.

15. A radio network node comprising:
circuitry configured to
  allocate component carriers to one or more mobile nodes for carrier aggregated wireless data transmission;
  allocate time division duplex uplink/downlink configurations for the allocated component carriers;
  configure cross-carrier scheduling for the mobile nodes;
  examine the allocated time division duplex uplink/downlink configurations and the configured cross-carrier scheduling configurations to determine if one or more of targeted subframes exists, the targeted subframes being subframes allocated to uplink in a first component carrier transmitted from a cross-carrier scheduling cell and to downlink in a second component carrier transmitted from a cross-carrier scheduled cell; and
  transmit a downlink control region for uplink/downlink grants in the targeted subframes in the second component carrier in response to at least one targeted subframe existing.

16. The radio network node of claim 15, wherein the circuitry is configured to:
  configure a control format indicator having a value indicating a length of the downlink control region in the targeted subframes in the second component carrier; and
  transmit the configured control format indicator to the mobile nodes via control format signaling.

17. The radio network node according to claim 16, wherein:
  the circuitry is configured to map downlink user data in the targeted subframes in the second component carrier based on the value of the configured control format indicator.

18. The radio network node of claim 16, wherein
  the downlink control region comprises a physical downlink control channel, the control format indicator comprises a physical control format indicator channel, and the downlink user data comprises a physical downlink shared channel.

* * * * *

UNITED STATES PATENT AND TRADEMARK OFFICE
CERTIFICATE OF CORRECTION

PATENT NO. : 9,456,454 B2  
APPLICATION NO. : 14/122425  
DATED : September 27, 2016  
INVENTOR(S) : Chunyan Gao et al.

Page 1 of 1

It is certified that error appears in the above-identified patent and that said Letters Patent is hereby corrected as shown below:

Claim 9
Column 15, Line 26, please change "carried" to --carrier--.

Signed and Sealed this
Twenty-seventh Day of March, 2018

Andrei Iancu
*Director of the United States Patent and Trademark Office*